US011738727B2

(12) United States Patent
Takahashi

(10) Patent No.: US 11,738,727 B2
(45) Date of Patent: Aug. 29, 2023

(54) BRAKE CONTROL DEVICE

(71) Applicant: ADVICS CO., LTD., Kariya (JP)

(72) Inventor: Kenichiro Takahashi, Gifu (JP)

(73) Assignee: ADVICS CO., LTD., Kariya (JP)

( * ) Notice: Subject to any disclaimer, the term of this patent is extended or adjusted under 35 U.S.C. 154(b) by 402 days.

(21) Appl. No.: 17/259,739

(22) PCT Filed: Jul. 29, 2019

(86) PCT No.: PCT/JP2019/029692
§ 371 (c)(1),
(2) Date: Jan. 12, 2021

(87) PCT Pub. No.: WO2020/027064
PCT Pub. Date: Feb. 6, 2020

(65) Prior Publication Data
US 2021/0139005 A1    May 13, 2021

(30) Foreign Application Priority Data

Jul. 31, 2018  (JP) ................................. 2018-143216

(51) Int. Cl.
*B60T 8/17* (2006.01)
*B60T 8/172* (2006.01)
*B60T 17/22* (2006.01)

(52) U.S. Cl.
CPC ................ *B60T 8/17* (2013.01); *B60T 8/172* (2013.01); *B60T 17/221* (2013.01);
(Continued)

(58) Field of Classification Search
CPC .... B60T 8/17; B60T 17/221; B60T 2270/403; B60T 2270/402; B60T 2270/406; B60T 8/172
See application file for complete search history.

(56) References Cited

U.S. PATENT DOCUMENTS 10,583,815 B2 *  3/2020  Ninoyu ................ B60T 13/146
2007/0252428 A1 * 11/2007  Okano ................. B60T 8/4081
                                                       303/113.1
(Continued)

FOREIGN PATENT DOCUMENTS

JP    2013086618 A    5/2013
JP    2017-065559 A   4/2017

OTHER PUBLICATIONS

Japanese Patent No. JP 06127293 to Shirai et al published on May 10, 1994.*

(Continued)

*Primary Examiner* — Pamela Rodriguez
(74) *Attorney, Agent, or Firm* — BUCHANAN INGERSOLL & ROONEY PC

(57) ABSTRACT

A brake control device includes a first braking unit and a second braking unit for applying braking force to wheels of a vehicle. The second braking unit generates auxiliary braking force when actual braking force generated by the first braking unit is short by a predetermined amount. This brake control device includes a determination unit that determines whether a delay correlation value correlated with response delay of the actual braking force is within an allowable range when the auxiliary braking force is generated, and a control unit that executes auxiliary reduction control for reducing the auxiliary braking force when the determination unit determines that the delay correlation value is within the allowable range.

10 Claims, 3 Drawing Sheets

(52) U.S. Cl.
CPC ... *B60T 2270/402* (2013.01); *B60T 2270/403* (2013.01); *B60T 2270/406* (2013.01)

(56) References Cited

U.S. PATENT DOCUMENTS

| | | | | |
|---|---|---|---|---|
| 2015/0352960 A1* | 12/2015 | Okano | ................. | B60T 8/4077 701/70 |
| 2016/0339889 A1* | 11/2016 | Okano | ................... | B60T 7/042 |
| 2018/0304870 A1 | 10/2018 | Ninoyu et al. | | |

OTHER PUBLICATIONS

Japanese Patent No. JP 2015110361 to Shimada et al published on Jun. 18, 2015.*
International Search Report (PCT/ISA/210) dated Oct. 8, 2019, by the Japan Patent Office as the International Searching Authority for International Application No. PCT/JP2019/029692.
Written Opinion (PCT/ISA/237) dated Oct. 8, 2019, by the Japan Patent Office as the International Searching Authority for International Application No. PCT/JP2019/029692.

* cited by examiner

BRAKE CONTROL DEVICE

TECHNICAL FIELD

The present disclosure relates to a brake control device.

BACKGROUND ART

Some vehicle brake control devices have two braking units, which are a first braking unit and a second braking unit, applying braking force to a wheel. In such brake control device, the first braking unit mainly generate braking force, and the second braking unit generates auxiliary braking force to generate a target braking force. The brake control device is generally configured to generate auxiliary braking force by the second braking unit when main braking force, which is generated by the first braking force, is short by a predetermined amount with respect to actual braking force. For example, JP-A-2013-86618 discloses a braking force control device that generates assist braking force by an actuator provided between a master cylinder and a wheel when a predetermined shortage occurs in hydraulic braking force based on a hydraulic pressure of the master cylinder.

Citation List

Patent Literature

PTL 1: JP-A-2013-86618

SUMMARY

Technical Problem

The braking force control device is configured to operate the actuator when hydraulic braking force is short by predetermined amount. This ensures responsiveness of braking, but needs high frequency of operation of the actuator. The operation of the actuator makes a noise. Accordingly, there is room for improvement in the braking force control device.

This disclosure has been made in view of the above issue, and an object of the disclosure is to provide a brake control device in which appropriate responsiveness can be ensured and the operating noise can be reduced.

Solution to Problem

A brake control device according to the disclosure is a brake control device including a first braking unit and a second braking unit for applying braking force to wheel of a vehicle. The first braking unit generates actual braking force applied to the wheel. The second braking unit generates auxiliary braking force when the actual braking force is short by predetermined amount. This brake control device includes a determination unit and a control unit. The determination unit determines whether delay correlation value correlated with response delay of the actual braking force is within an allowable range when the auxiliary braking force is generated. The control unit executes auxiliary reduction control for reducing the auxiliary braking force when the determination unit determines that the delay correlation value is within the allowable range.

Advantageous Effects

Performance or responsiveness of the first braking unit for increasing the braking force may be decreased due to, for example, aging or temperature environment.

The second braking unit of the conventional braking control device generates the auxiliary braking force even when the delay correlation value is within the allowable range, or even when the main braking force is enough to the target braking force. However, the braking control device of the disclosure, the auxiliary braking force can be reduced or reduced to zero as long as the delay correlation value is within the allowable range, even when the conventional braking control device generates the auxiliary braking force. Consequently, operating noise of the second braking unit can be reduced.

DESCRIPTION OF EMBODIMENTS

Figure 1:
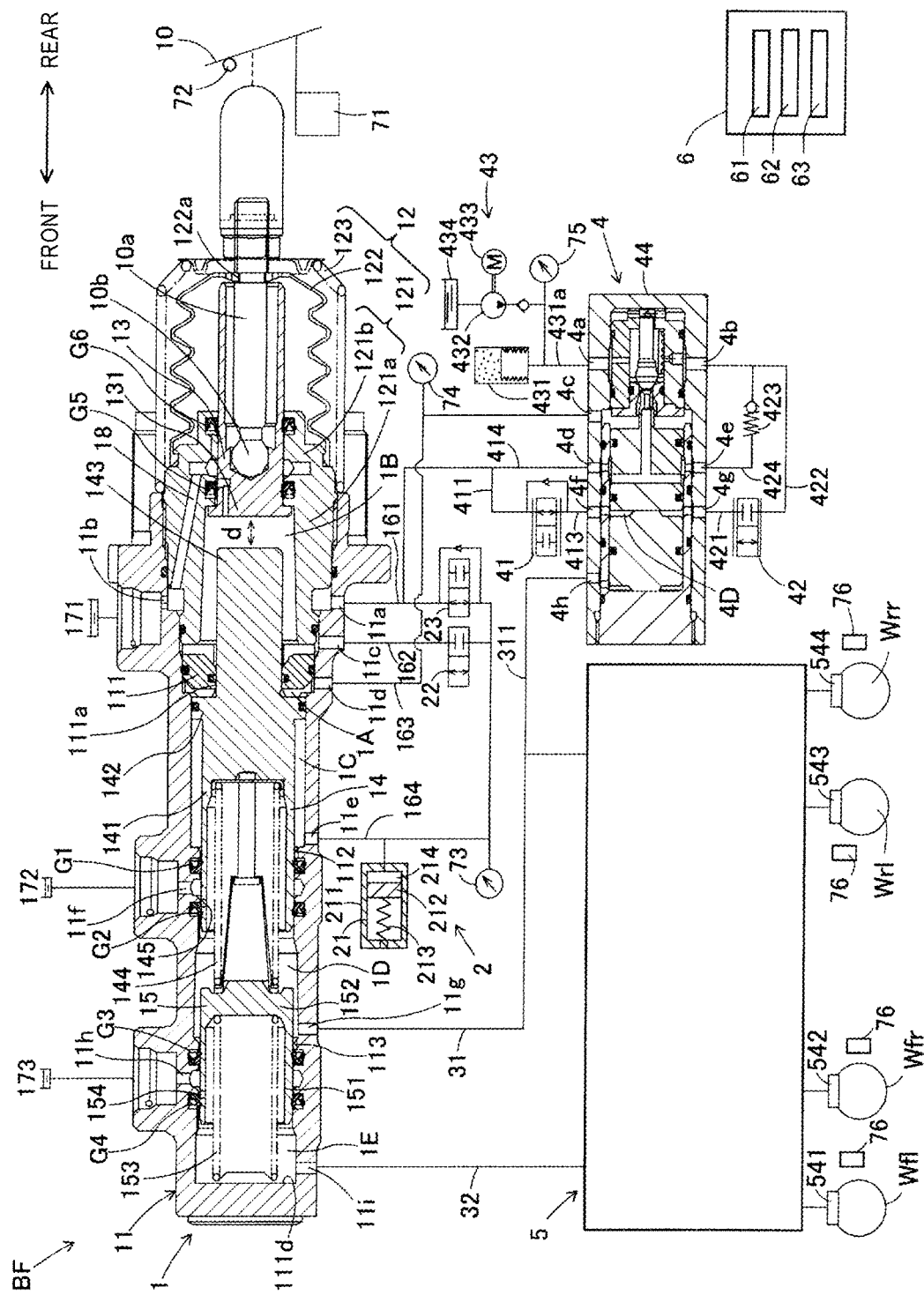
FIG. 1 is a configuration diagram of a brake control device according to the present embodiment.
Figure 2:
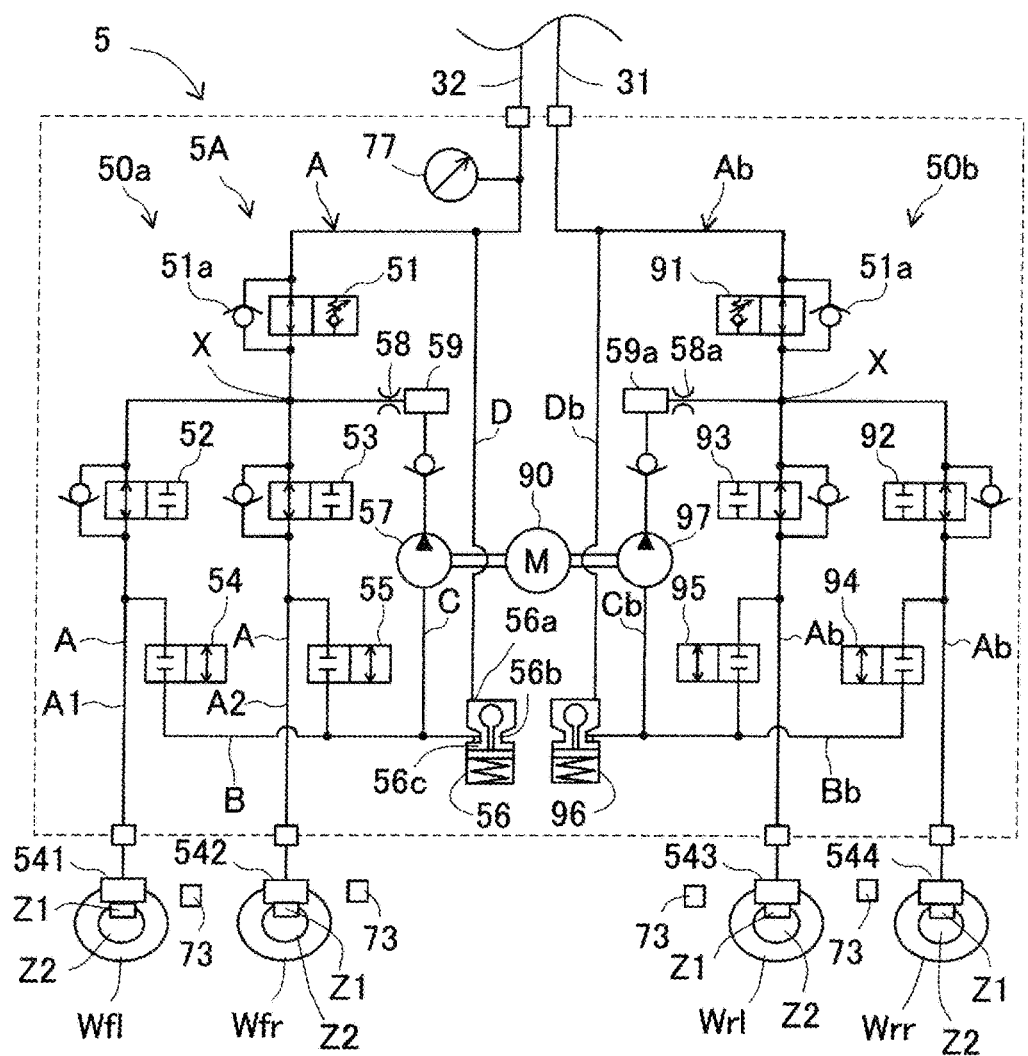
FIG. 2 is a configuration diagram of an actuator according to the present embodiment.

Hereinafter, an embodiment of the disclosure will be described with reference to the drawings. The drawings used in the description are conceptual diagrams, and the shape of each part is not necessarily precise. As shown in FIGS. 1 and 2, a brake control device BF of the present embodiment includes a master cylinder portion 1, a reaction force generating device 2, a first control valve 22, a second control valve 23, a servo pressure generating device (corresponding to a first braking unit) 4, an actuator (corresponding to a second braking unit) 5, wheel cylinders 541 to 544, various sensors 71 to 77, and a brake ECU 6. In the description, wheels Wfl, Wfr, Wrl, Wrr may be referred to as wheels W, front wheels Wfl and Wfr may be referred to as front wheels Wf, and rear wheels Wrl and Wrr may be referred to as rear wheels Wr. For example, a brake pad Z1 and a brake rotor Z2 are provided on each wheel W.

The master cylinder portion 1 is a portion that supplies brake fluid to the actuator 5 according to an operation amount of a brake pedal 10, which is a brake operating member, and includes a main cylinder 11, a cover cylinder 12, an input piston 13, a first master piston 14, and a second master piston 15. The brake pedal 10 may be any brake operating members that allows a driver to operate a brake.

The main cylinder 11 is a bottomed substantially cylindrical housing whose front is closed and rear is opened. An inner wall portion 111 that protrudes in an inward flange shape is provided on an inner periphery of the main cylinder 11 toward the rear. A center of the inner wall portion 111 is a through hole 111a penetrating in a front-rear direction. Further, small diameter portions 112 (rear), 113 (front) having a slightly smaller inner diameter are provided in front of the inner wall portion 111 inside the main cylinder 11. That is, the small diameter portions 112, 113 protrude inwardly annularly from an inner peripheral surface of the main cylinder 11. Inside the main cylinder 11, the first master piston 14 is disposed so as to be in sliding contact with the small diameter portion 112 and movable in an axial direction. Similarly, the second master piston 15 is disposed so as to be in sliding contact with the small diameter portion 113 and movable in the axial direction.

The cover cylinder 12 is configured with a substantially cylindrical cylinder portion 121, a bellows tubular boot 122, and a cup-shaped compression spring 123. The cylinder portion 121 is disposed on a rear end of the main cylinder 11 and is coaxially fitted to an opening on the rear of the main cylinder 11. An inner diameter of a front portion 121a of the cylinder portion 121 is larger than an inner diameter of the through hole 111a of the inner wall portion 111. Further, an inner diameter of a rear portion 121b of the cylinder portion 121 is smaller than the inner diameter of the front portion 121a.

The boot 122 for dustproof has a bellows tubular shape and can be expanded and contracted in the front-rear direction, and is assembled such that a front thereof is in contact with a rear end opening of the cylinder portion 121. A through hole 122a is formed in a center of a rear of the boot 122. The compression spring 123 is a coiled biasing member disposed around the boot 122, a front thereof abuts on the rear end of the main cylinder 11, and a rear thereof is reduced in diameter so as to be close to the through hole 122a of the boot 122. A rear end of the boot 122 and a rear end of the compression spring 123 are coupled to an operating rod 10a. The compression spring 123 biases the operating rod 10a rearward.

The input piston 13 is a piston that slides in the cover cylinder 12 according to the operation of the brake pedal 10. The input piston 13 is a bottomed substantially cylindrical piston having a bottom surface in the front and an opening in the rear. A bottom wall 131 forming the bottom surface of the input piston 13 has a diameter larger than that of other portions of the input piston 13. The input piston 13 is axially slidably and liquid-tightly disposed in the rear portion 121b of the cylinder portion 121, and the bottom wall 131 enters an inner periphery of the front portion 121a of the cylinder portion 121.

The operating rod 10a in conjunction with the brake pedal 10 is disposed in the input piston 13. A pivot 10b at a tip end of the operating rod 10a is capable of pushing the input piston 13 forward. A rear end of the operating rod 10a protrudes outward through the rear opening of the input piston 13 and the through hole 122a of the boot 122, and is connected to the brake pedal 10. When the brake pedal 10 is depressed, the operating rod 10a advances while pushing the boot 122 and the compression spring 123 in the axial direction. As the operating rod 10a advances, the input piston 13 also advances in conjunction with the operating rod 10a.

The first master piston 14 is axially slidably disposed on the inner wall portion 111 of the main cylinder 11. The first master piston 14 is formed by integrally forming a pressure cylinder portion 141, a flange portion 142, and a protruding portion 143 in order from the front. The pressure cylinder portion 141 is formed in a bottomed substantially cylindrical shape having an opening at the front, has a gap with the inner peripheral surface of the main cylinder 11, and is in sliding contact with the small diameter portion 112. In an internal space of the pressure cylinder portion 141, a coil spring-shaped biasing member 144 is disposed between the pressure cylinder portion 141 and the second master piston 15. The first master piston 14 is biased rearward by the biasing member 144. In other words, the first master piston 14 is biased by the biasing member 144 toward a set initial position.

The flange portion 142 has a diameter larger than that of the pressure cylinder portion 141 and is in sliding contact with the inner peripheral surface of the main cylinder 11. The protruding portion 143 has a diameter smaller than that of the flange portion 142, and is disposed so as to slide in a liquid-tight manner in the through hole 111a of the inner wall portion 111. A rear end of the protruding portion 143 passes through the through hole 111a and protrudes into an internal space of the cylinder portion 121, and is separated from an inner peripheral surface of the cylinder portion 121. A rear end surface of the protruding portion 143 is separated from the bottom wall 131 of the input piston 13, and a separation distance d therebetween is configured to be variable. As described above, in an initial state, the first master piston 14 is disposed in front of the input piston 13 at the separation distance d from the input piston 13.

Here, a first master chamber 1D is partitioned by the inner peripheral surface of the main cylinder 11, a front of the pressure cylinder portion 141 of the first master piston 14, and a rear of the second master piston 15. Further, a rear chamber in the rear of the first master chamber 1D is partitioned by the inner peripheral surface, or inner peripheral portion, of the main cylinder 11, the small diameter portion 112, a front surface of the inner wall portion 111, and an outer peripheral surface of the first master piston 14. A front end portion and rear end portion of the flange portion 142 of the first master piston 14 divide the rear chamber into front and rear, a second hydraulic chamber 1C is partitioned on the front, and a servo chamber 1A is partitioned on the rear. A volume of the second hydraulic chamber 1C decreases as the first master piston 14 advances, and the volume increases as the first master piston 14 retracts. Further, a first hydraulic chamber 1B is partitioned by the inner peripheral portion of the main cylinder 11, a rear surface of the inner wall portion 111, the inner peripheral surface, or inner peripheral portion, of the front portion 121a of the cylinder portion 121, the protruding portion 143, or rear end portion, of the first master piston 14, and a front end portion of the input piston 13.

The second master piston 15 is disposed in front of the first master piston 14 in the main cylinder 11, so as to be movable in the axial direction and in sliding contact with the small diameter portion 113. The second master piston 15 is formed by integrally forming a cylindrical pressure cylinder portion 151 having an opening at the front, and a bottom wall 152 that closes a rear of the pressure cylinder portion 151. The bottom wall 152 supports the biasing member 144 between the first master piston 14 and the bottom wall. In an internal space of the pressure cylinder portion 151, a coil spring-shaped biasing member 153 is disposed between a closed inner bottom surface 111d of the main cylinder 11. The second master piston 15 is biased rearward by the biasing member 153. In other words, the second master piston 15 is biased by the biasing member 153 toward a set initial position. A second master chamber 1E is partitioned by the inner peripheral surface of the main cylinder 11, the inner bottom surface 111d, and the second master piston 15.

The master cylinder portion 1 is formed with ports 11a to 11i that communicate an inside and an outside. The port 11a is formed behind the inner wall portion 111 of the main cylinder 11. The port 11b is formed at a position same as that of the port 11a in the axial direction, and faces the port 11a. The ports 11a and 11b communicate with each other through an annular space between the inner peripheral surface of the main cylinder 11 and an outer peripheral surface of the cylinder portion 121. The ports 11a and 11b are connected to a pipe 161, and connected to a reservoir 171, or low pressure source.

Further, the port 11b communicates with the first hydraulic chamber 1B by a passage 18 formed in the cylinder portion 121 and the input piston 13. The passage 18 is cut off when the input piston 13 advances, thereby shutting off the first hydraulic chamber 1B and the reservoir 171. The port 11c is formed behind the inner wall portion 111 and in front of the port 11a, and communicates the first hydraulic chamber 1B with a pipe 162. The port 11d is formed in front of the port 11c, and communicates the servo chamber 1A with a pipe 163. The port 11e is formed in front of the port 11d, and communicates the second hydraulic chamber 1C with a pipe 164.

The port 11f is formed between two sealing members G1, G2 of the small diameter portion 112, and communicates a reservoir 172 with an inside of the main cylinder 11. The port 11f communicates with the first master chamber 1D via a passage 145 formed in the first master piston 14. The passage 145 is formed at a position where the port 11f and the first master chamber 1D are cut off when the first master piston 14 advances. The port 11g is formed in front of the port 11f, and communicates the first master chamber 1D with a pipeline 31.

The port 11h is formed between two sealing members G3, G4 of the small diameter portion 113, and communicates a reservoir 173 with the inside of the main cylinder 11. The port 11h communicates with the second master chamber 1E via a passage 154 formed in the pressure cylinder portion 151 of the second master piston 15. The passage 154 is formed at a position where the port 11h and the second master chamber 1E are cut off when the second master piston 15 advances. The port 11i is formed in front of the port 11h, and communicates the second master chamber 1E with a pipeline 32.

Further, a sealing member such as an O-ring is appropriately disposed in the master cylinder portion 1. The sealing members G1, G2 are disposed at the small diameter portion 112, and are liquid-tightly in contact with the outer peripheral surface of the first master piston 14. Similarly, the sealing members G3, G4 are disposed at the small diameter portion 113, and are liquid-tightly in contact with an outer peripheral surface of the second master piston 15. Further, sealing members G5, G6 are also disposed between the input piston 13 and the cylinder portion 121.

The stroke sensor 71 detects an operation amount, or stroke, of the brake pedal 10 which is operated by a driver, and transmits a detection signal to the brake ECU 6. The brake stop switch 72 detects whether a driver operates the brake pedal 10 with a binary signal, and transmits the detection signal to the brake ECU 6.

The reaction force generating device 2 generates a reaction force against an operating force generated when the brake pedal 10 is operated, and is mainly configured with a stroke simulator 21. The stroke simulator 21 generates a reaction force hydraulic pressure in the first hydraulic chamber 1B and the second hydraulic chamber 1C according to the operation of the brake pedal 10. The stroke simulator 21 is configured such that a piston 212 is slidably fitted to a cylinder 211. The piston 212 is biased rearward by a compression spring 213, and a reaction force hydraulic chamber 214 is formed on a rear surface of the piston 212. The reaction hydraulic pressure chamber 214 connects to the second hydraulic chamber 1C via the pipe 164 and the port 11e, and the reaction force hydraulic chamber 214 further connects to the first control valve 22 and the second control valve 23 via the pipe 164.

The first control valve 22 is a normally-closed solenoid valve controlled by the brake ECU 6. The first control valve 22 is between the pipe 164 and the pipe 162. Here, the pipe 164 communicates with the second hydraulic chamber 1C via the port 11e, and the pipe 162 communicates with the first hydraulic chamber 1B via the port 11c. Further, when the first control valve 22 is opened, the first hydraulic chamber 1B is opened. When the first control valve 22 is closed, the first hydraulic chamber 1B is closed. Consequently, the pipe 164 and the pipe 162 are provided so as to communicate the first hydraulic chamber 1B and the second hydraulic chamber 1C.

When the first control valve 22 is closed in a non-energized state, the first hydraulic chamber 1B and the second hydraulic chamber 1C are cut off. As a result, no brake fluid flow out of the first hydraulic chamber 1B, and the input piston 13 and the first master piston 14 are in conjunction with each other while a constant separation distance is maintained. Further, the first control valve 22 is opened in an energized state when being energized, and at this time, the first hydraulic chamber 1B and the second hydraulic chamber 1C are communicated. As a result, volume changes in the first hydraulic chamber 1B and the second hydraulic chamber 1C due to the advance/retract of the first master piston 14 are canceled by movement of the brake fluid.

The pressure sensor 73 detects reaction force hydraulic pressures of the second hydraulic chamber 1C and the first hydraulic chamber 1B, and is connected to the pipe 164. The pressure sensor 73 detects the pressure in the second hydraulic chamber 1C when the first control valve 22 is closed, and detects the pressure in the communicated first hydraulic chamber 1B when the first control valve 22 is opened. The pressure sensor 73 transmits a detection signal to the brake ECU 6.

The second control valve 23 is a normally-opened solenoid valve controlled by the brake ECU 6. The second control valve 23 is connected between the pipe 164 and the pipe 161. Here, the pipe 164 communicates with the second hydraulic chamber 1C via the port 11e, and the pipe 161 communicates with the reservoir 171 via the port 11a. Therefore, when the second control valve 23 communicates between the second hydraulic chamber 1C and the reservoir 171 in the non-energized state, a reaction force hydraulic pressure is not generated. Additionally, when the second control valve 23 is cut off in the energized state, a reaction force hydraulic pressure is generated.

The servo pressure generating device 4 is a hydraulic booster, which is a boosting device, and includes a pressure reducing valve 41, a pressure increasing valve 42, a pressure supply unit 43, and a regulator 44. The pressure reducing valve 41 is a normally-opened solenoid valve (linear valve) that opens in the non-energized state, and a flow rate (or pressure) thereof is controlled by the brake ECU 6. One end of the pressure reducing valve 41 is connected to the pipe 161 via a pipe 411, and the other end of the pressure reducing valve 41 is connected to a pipe 413. That is, one end of the pressure reducing valve 41 communicates with the reservoir 171 via the pipes 411 and 161, and the ports 11a, 11b. By closing the pressure reducing valve 41, the brake fluid is prevented from flowing out from a pilot chamber 4D. The reservoir 171 and a reservoir 434 communicate with each other (not shown). The reservoir 171 and the reservoir 434 may be the same reservoir.

The pressure increasing valve 42 is a normally-closed solenoid valve (linear valve) that closes in the non-energized state, and the flow rate (or pressure) thereof is controlled by the brake ECU 6. One end of the pressure increasing valve 42 is connected to a pipe 421, and the other end of the pressure increasing valve 42 is connected to a pipe 422. The pressure supply unit 43 is a portion that mainly supplies a high-pressure brake fluid to the regulator 44. The pressure supply unit 43 includes an accumulator 431, a hydraulic pump 432, a motor 433, and the reservoir 434. The pressure sensor 75 detects a hydraulic pressure, which is of the accumulator 431 (hereinafter, accumulator pressure). When the accumulator pressure is less than a predetermined pressure, the brake ECU 6 drives the motor 433 and the pump 432 to maintain the accumulator pressure at the predetermined pressure or higher.

The regulator 44 is a mechanical regulator, and the pilot chamber 4D is formed inside the regulator 44. Further, the regulator 44 has a plurality of ports 4a to 4h. The pilot chamber 4D connects to the pressure reducing valve 41 via the port 4f and the pipe 413, and connects to the pressure increasing valve 42 via the port 4g and the pipe 421. By opening the pressure increasing valve 42, the high-pressure brake fluid is supplied from the accumulator 431 to the pilot chamber 4D via the ports 4a, 4b, 4g. Then the pilot chamber 4D expands by moving a piston. A valve member moves in response to this expansion, the port 4a and the port 4c communicate with each other, and then the high-pressure brake fluid is supplied to the servo chamber 1A via the pipe 163. On the other hand, when the pressure reducing valve 41 is opened, a hydraulic pressure of the pilot chamber 4D (pilot pressure) decreases, and a flow path between the port 4a and the port 4c is cut off by the valve member.

In this way, the brake ECU 6 controls a pilot pressure corresponding to a servo pressure, and controls the servo pressure by controlling the pressure reducing valve 41 and the pressure increasing valve 42. The servo pressure corresponds to the pilot pressure and a master pressure, and is detected by the pressure sensor 74. The brake ECU 6 controls the servo pressure generating device 4 so that the servo pressure approaches a target servo pressure. The target servo pressure is set based on, for example, a target wheel pressure, target deceleration, target braking force related to a brake operation of a driver.

The actuator 5 is disposed between the first master chamber 1D and the second master chamber 1E generating the master pressure, and the wheel cylinders 541 to 544. The actuator 5 and the first master chamber 1D are connected via the pipeline 31. The actuator 5 and the second master chamber 1E are connected via the pipeline 32. The actuator 5 adjusts hydraulic pressures of the wheel cylinders 541 to 544, which is wheel pressures, according to the brake ECU 6 input. The actuator 5 executes pressure increasing control that further increases a pressure of the brake fluid from the master pressure, pressurization control, depressurization control, or holding control according to the brake ECU 6 input. The actuator 5 executes anti-lock braking (ABS) control, electronic stability control (ESC), or the like by combining these controls based on the brake ECU 6 input.

Specifically, the actuator 5 includes a hydraulic circuit 5A and a motor 90, as shown in FIG. 2. The hydraulic circuit 5A includes a first pipe system 50a and a second pipe system 50b. The first pipe system 50a controls the hydraulic pressure (wheel pressure) applied to the front wheels Wfl, Wfr. The second pipe system 50b controls the hydraulic pressure (wheel pressure) applied to the rear wheels Wrl, Wrr. Further, a wheel speed sensor 76 is provided for each wheel W. In the present embodiment, front and rear pipes are adopted.

The first pipe system 50a includes a main pipeline A, a differential pressure control valve 51, pressure increasing valves 52, 53, a pressure reducing pipeline B, pressure reducing valve 54, 55, a pressure adjusting reservoir 56, a recirculation pipeline C, a pump 57, an auxiliary pipeline D, an orifice portion 58, and a damper portion 59. In the description, the term of pipeline can be replaced with, for example, a hydraulic line, a flow path, an oil passage, a passage, a pipe, or the like.

The main pipeline A connects the pipeline 32 to the wheel cylinders 541, 542. The differential pressure control valve 51 is a solenoid valve that is provided in the main pipeline A and controls the main pipeline A in a communication state and a differential pressure state. In the differential pressure state, the flow of the brake fluid path is restricted by a valve. The differential pressure state can be said to be a throttled state. The differential pressure control valve controls a differential pressure between a hydraulic pressure in a master cylinder portion 1 side centered on itself and a hydraulic pressure in a wheel cylinders 541, 542 side according to a control current based on the brake ECU 6 input. In other words, the differential pressure control valve 51 is configured to control a differential pressure between the hydraulic pressure in the master cylinder portion 1 side of the main pipeline A and the hydraulic pressure in the wheel cylinders 541, 542 side of the main pipeline A according to the control current.

The differential pressure control valve 51 is a normally-opened valve that is in the communication state when the valve is in the non-energized state. As the control current flowing through the differential pressure control valve 51 increases, the differential pressure becomes larger. When the pump 57 is driven in the differential pressure state, the hydraulic pressure in the wheel cylinders 541, 542 side is larger than the hydraulic pressure in the master cylinder portion 1 side. A check valve 51a is provided for the differential pressure control valve 51. The main pipeline A is branched into two pipelines A1, A2 at a branch point X downstream of the differential pressure control valve 51, so as to correspond to the wheel cylinders 541, 542.

The pressure increasing valves 52, 53 are solenoid valves that open and close according to the brake ECU 6 input, and are normally-opened solenoid valves during an open state (communication state) in the non-energized state. The pressure increasing valve 52 is disposed in the pipeline A1, and the pressure increasing valve 53 is disposed in the pipeline A2. The pressure increasing valves 52, 53 are opened in the non-energized state during the pressurization control to communicate the wheel cylinders 541 to 544 with the branch point X, and are energized and closed during the holding control and the depressurization control to cut off the communication between the wheel cylinders 541 to 544 and the branch point X.

The pressure reducing pipeline B is a pipeline that connects between the pressure increasing valve 52 and the wheel cylinders 541, 542 in the pipeline A1 and the pressure adjusting reservoir 56, and connects between the pressure increasing valve 53 and the wheel cylinders 541, 542 in the pipeline A2 and the pressure adjusting reservoir 56. The pressure reducing valves 54, 55 are solenoid valves that open and close according to the brake ECU 6 input, and are normally-closed solenoid valves during a close state (cut off state) in the non-energized state. The pressure reducing valve 54 is disposed in the pressure reducing pipeline B on the wheel cylinders 541, 542 side. The pressure reducing valve 55 is disposed in the pressure reducing pipeline B on the wheel cylinders 541, 542 side. The pressure reducing valves 54, 55 are mainly energized during the depressurization control to be in the open state, and communicate the wheel cylinders 541, 542 and the pressure adjusting reservoir 56 via the pressure reducing pipeline B. The pressure adjusting reservoir 56 has a cylinder, a piston, and a biasing member.

The recirculation pipeline C connects the pressure reducing pipeline B or the pressure adjusting reservoir 56, and between the differential pressure control valve 51 and the pressure increasing valves 52, 53 (here, the branch point X) in the main pipeline A. The pump 57 is provided in the recirculation pipeline C so that a discharge port is disposed on a branch point X side, and a suction port is disposed on a pressure adjusting reservoir 56 side. The pump 57 is a gear electric pump (gear pump) driven by the motor 90. The pump supplies the brake fluid from the pressure adjusting reservoir 56 to the master cylinder portion 1 side or the wheel cylinders 541, 542 side via the recirculation pipeline C. Further, for example, during the anti-lock braking control, the pump 57 pumps the brake fluid in the wheel cylinders 541, 542 back to the master cylinder portion 1 via the pressure reducing valves 54, 55 in the open state. In this way, the pump 57 is disposed between the master cylinder portion 1 and the wheel cylinders 541, 542, and the brake fluid in the wheel cylinders 541, 542 can be discharged out of the wheel cylinders 541, 542.

The pump 57 repeats a discharge process of discharging the brake fluid and a suction process of sucking the brake fluid. That is, when the pump 57 is driven by the motor 90, the discharge process and the suction process are alternately and repeatedly executed. In the discharge process, the brake fluid sucked from the pressure adjusting reservoir 56 in the suction process is supplied to the branch point X. The motor 90 is energized via a relay (not shown) for driving according to the brake ECU 6 input. The pump 57 and the motor 90 can be said to be combined as an electric pump.

The orifice portion 58 is a throttle-shaped portion, so-called orifice, provided in a portion of the recirculation pipeline C between the pump 57 and the branch point X. The damper portion 59, or damper mechanism, connects to a portion of the recirculation pipeline C between the pump 57 and the orifice portion 58. The damper portion 59 absorbs and discharges the brake fluid according to a pulsation of the brake fluid in the recirculation pipeline C. The orifice portion 58 and the damper portion 59 are a pulsation reduction mechanism that reduces, attenuates, and absorbs the pulsation.

The auxiliary pipeline D connects a pressure adjusting hole 56a of the pressure adjusting reservoir 56 and upstream of the differential pressure control valve 51 in the main pipeline A or master cylinder portion 1. The pressure adjusting reservoir 56 is configured such that a valve hole 56b is closed as an inflow amount of the brake fluid into the pressure adjusting hole 56a increases due to an increase in the stroke. A reservoir chamber 56c is provided on the pipelines B, C side of the valve hole 56b.

By driving the pump 57, the brake fluid in the pressure adjusting reservoir 56 or the master cylinder portion 1 is discharged to the portion (branch point X) in the main pipeline A between the differential pressure control valve 51 and the pressure increasing valves 52, 53 via the recirculation pipeline C. Then, the wheel pressure is pressurized according to a control state of the differential pressure control valve 51 and the pressure increasing valves 52, 53. In this way, in the actuator 5, the pressure increasing control is executed by the drive of the pump 57 and controlling various valves. That is, the actuator 5 is configured to be capable of pressurizing the wheel pressure. A pressure sensor 77 is provided at a portion of the main pipeline A between the differential pressure control valve 51 and the master cylinder portion 1 so as to detect the hydraulic pressure (master pressure) of the portion. The pressure sensor 77 transmits a detection result to the brake ECU 6.

The second pipe system 50b has a configuration same as that of the first pipe system 50a, and is a system for adjusting hydraulic pressures of wheel cylinders 543, 544 of the rear wheels Wrl, Wrr. The second pipe system 50b includes a main pipeline Ab connecting the pipeline 31 and the wheel cylinders 543, 544 and corresponding to the main pipeline A, a differential pressure control valve 91 corresponding to the differential pressure control valve 51, pressure increasing valves 92, 93 corresponding to the pressure increasing valves 52, 53, a pressure reducing pipeline Bb corresponding to the pressure reducing pipeline B, pressure reducing valve 94, 95 corresponding to the pressure reducing valve 54, 55, a pressure adjusting reservoir 96 corresponding to the pressure adjusting reservoir 56, a recirculation pipeline Cb corresponding to the recirculation pipeline C, a pump 97 corresponding to the pump 57, an auxiliary pipeline Db corresponding to the auxiliary pipeline D, an orifice portion 58a corresponding to the orifice portion 58, and a damper portion 59a corresponding to the damper portion 59. For the detailed configuration of the second pipe system 50b, the description of the first pipe system 50a can be referred to, and a description thereof is omitted. Further, in the following description, the reference numerals of the first pipe system 50a are used for the description of each portion of the actuator 5, and the reference numerals of the second pipe system 50b are omitted.

The brake ECU 6 is an electronic control unit (ECU) including a CPU, memory, and the like. The brake ECU 6 is an ECU that executes control for the servo pressure generating device 4 and the actuator 5 based on the target wheel pressure, which is a target value of the wheel pressure. The target wheel pressure corresponds to the target braking force (required braking force) and the target deceleration (required deceleration), and is set according to, for example, a brake operation of a driver. The brake ECU 6 can calculate (estimate) each wheel pressure based on the detection result of the pressure sensor 77 (master pressure), the control state of the actuator 5, and the like. When a pressure sensor for detecting the wheel pressure is provided, the brake ECU 6 may acquire a detection result of the pressure sensor as wheel pressure information.

Based on the target wheel pressure, the brake ECU 6 executes the pressurization control (pressure increasing control), the depressurization control, or the holding control with respect to the servo pressure generating device 4. In the pressurization control, the pressure increasing valve 42 is opened, and the pressure reducing valve 41 is closed. In the depressurization control, the pressure increasing valve 42 is closed, and the pressure reducing valve 41 is opened. In the holding control, the pressure increasing valve 42 and the pressure reducing valve 41 are closed.

Various sensors 71 to 77 are connected to the brake ECU 6. The brake ECU 6 acquires, from these sensors, stroke information, master pressure information, reaction force hydraulic pressure information, servo pressure information, and wheel speed information. The above sensors and the brake ECU 6 are connected by a communication line (CAN) (not shown). The brake ECU 6 can execute the pressurization control, the depressurization control, the holding control, or the pressure increasing control with respect to the actuator 5.

Here, when each control state of the actuator 5 is briefly described by taking control of the wheel cylinder 541 as an example, in the pressurization control, the pressure increasing valve 52 (and the differential pressure control valve 51) is opened, and the pressure reducing valve 54 is closed. The check valve 51a provided in parallel with the differential pressure control valve 51 allows a flow of the brake fluid from upstream to downstream, and bans reverse thereof. Therefore, when a hydraulic pressure on the upstream is higher than a hydraulic pressure on the downstream, the brake fluid is supplied downstream via the check valve 51a without controlling the differential pressure control valve 51. In the depressurization control, the pressure increasing valve 52 is closed, and the pressure reducing valve 54 is opened. In the holding control, the pressure increasing valve 52 and the pressure reducing valve 54 are closed. The holding control can also be executed by closing the pressure reducing valve 54 and closing (throttling) the differential pressure control valve 51 without closing the pressure increasing valve 52. Further, in the holding control, from a viewpoint of pressurization responsiveness, control is also performed in which a differential pressure is maintained while the brake fluid is leaked from the differential pressure control valve 51 to the upstream when the motor 90 and the pump 57 are driven. In the pressure increasing control, the differential pressure control valve 51 is in the differential pressure state (throttle state), the pressure increasing valve 52 is opened, the pressure reducing valve 54 is closed, and the motor 90 and the pump 57 are driven.

The brake ECU 6 sets the target deceleration based on the stroke information, and determines the target wheel pressure and the target master pressure according to the target deceleration. In the pressurization control, the brake ECU 6 basically operates only the servo pressure generating device 4 to increase the master pressure, so that the wheel pressure approaches the target wheel pressure. The brake ECU 6 causes the actuator 5 to generate an auxiliary braking force when an actual braking force (hydraulic braking force due to the wheel pressure) generated by the servo pressure generating device 4 is short by predetermined amount. The auxiliary braking force is generated by the actuator 5 increasing the wheel pressure. The auxiliary braking force is set according to a difference between the wheel pressure and the target wheel pressure.

(Auxiliary Reduction Control)

The brake ECU 6 includes a first determination unit 61, a second determination unit (corresponding to a determination unit) 62, and a control unit 63 for generating of the auxiliary braking force. The first determination unit 61 is configured to determine whether the actual braking force generated by the servo pressure generating device 4 is short by the predetermined amount (whether predetermined conditions with respect to an insufficient braking force are met). The first determination unit 61 determines whether there is a deficiency on the basis of the wheel pressure corresponding to the actual braking force and the target wheel pressure. In other words, the first determination unit 61 determines whether assistance obtained by the actuator 5 is required. At this time, since the wheel pressure is not increased by the actuator 5, a value of the master pressure corresponds to the wheel pressure.

The first determination unit 61 determines whether the difference between the wheel pressure and the target wheel pressure (hereinafter target differential pressure) is equal to or greater than a first threshold value. When the target differential pressure is equal to or greater than the first threshold value, the determination unit 61 determines that the actual braking force is short by predetermined amount. When the target differential pressure is less than the first threshold value, the determination unit 61 determines that the actual braking force is not short by the predetermined amount. When the first determination unit 61 determines that the actual braking force is short by predetermined amount, the control unit 63 causes the actuator 5 to execute the pressure increasing control to prepare for generating the auxiliary braking force. Specifically, the control unit 63 sets the auxiliary braking force (pressurization amount) according to a determination result of the second determination unit 62. When it is determined that the actual braking force is short by predetermined amount, a conventional brake ECU causes the actuator 5 to execute the pressure increasing control to generate the auxiliary braking force.

As described above, the braking control device BF includes the servo pressure generating device 4 (and the master cylinder portion 1) and the actuator 5 for applying braking force to the wheels W of the vehicle. The actuator 5 generates the auxiliary braking force when the actual braking force is short by predetermined amount.

When the first determination unit 61 determines that the actual braking force is short by predetermined amount and the auxiliary braking force is generated, the second determination unit 62 determines whether a delay correlation value correlated with response delay of the actual braking force is within an allowable range. Two values are set as the delay correlation value in the present embodiment. Specifically, the delay correlation values are a difference between the accumulator pressure (detected value of the pressure sensor 75) and the servo pressure (detected value of the pressure sensor 74), and the target differential pressure (the difference between the wheel pressure and the target wheel pressure).

The difference between the accumulator pressure and the servo pressure (hereinafter remaining force differential pressure) relates to boosting remaining force of the master pressure generated by the servo pressure generating device 4. The remaining force differential pressure correlates with the response delay of the actual braking force. It can be said that the greater the remaining force differential pressure is, the greater the boosting remaining force obtained by the servo pressure generating device 4 is, and the easier the response delay of the actual braking force can be eliminated. Further, for the target differential pressure, it can be said that the smaller the target differential pressure is, the easier the response delay of the actual braking force can be eliminated. In this way, the remaining force differential pressure correlates with the response delay, and the target differential pressure also correlates with the response delay.

When the remaining force differential pressure is equal to or greater than a second threshold value and the target differential pressure is less than a third threshold value, the second determination unit 62 determines that the delay correlation value is within the allowable range, and otherwise, the second determination unit 62 determines that the delay correlation value is not within the allowable range (out of the allowable range). The third threshold value is a value larger than the first threshold value set by the first determination unit (third threshold value>first threshold value).

When the second determination unit 62 determines that the delay correlation value is within the allowable range, the control unit 63 executes the auxiliary reduction control for reducing the auxiliary braking force. The auxiliary reduction control can be said to be control for reducing the auxiliary braking force in the case where the second determination unit 62 determines that the delay correlation value is within the allowable range, as compared with the case where the second determination unit 62 determines that the delay correlation value is out of the allowable range. The auxiliary braking force is set as a normal value according to a situation in which insufficient determination occurs, but in the auxiliary reduction control, the set normal value is reduced. Here, when the delay correlation value is within the allowable range, the control unit 63 of the present embodiment does not cause the actuator 5 to operate. That is, it can be said that the auxiliary reduction control of the present embodiment is control that reduces the auxiliary braking force to zero.

Further, even during the auxiliary reduction control, when the actual braking force is less than the target braking force and the actual braking force is less than an allowable lower limit value, the control unit 63 stops the auxiliary reduction control, and auxiliary increase control for increasing the auxiliary braking force is executed. In other words, during the auxiliary reduction control, when the wheel pressure is less than the target wheel pressure and the wheel pressure is less than the allowable lower limit value, the control unit 63 stops the auxiliary reduction control, and the auxiliary increase control for increasing the auxiliary braking force is executed. The auxiliary increase control of the present embodiment is control in which the actuator 5 is operated to cause the actuator 5 to execute the pressure increasing control. At this time, the auxiliary braking force is set to the normal value according to, for example, the situation.

Figure 3:
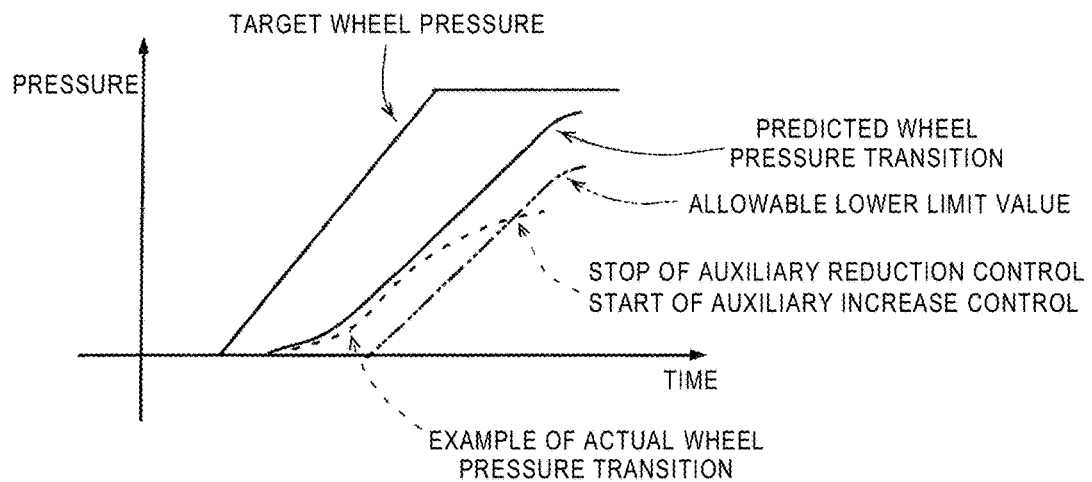
FIG. 3 is an explanatory diagram for illustrating an allowable lower limit value of the present embodiment.

As shown in FIG. 3, the allowable lower limit value is a value of the wheel pressure set lower than a predicted wheel pressure by a predetermined value at each time estimated based on transition of the wheel pressure. The control unit 63 predicts wheel pressure transition in the future based on actual wheel pressure transition and the control state, and sets an allowable lower limit value for the predicted wheel pressure transition (hereinafter predicted wheel pressure transition). That is, if the transition is as predicted, the wheel pressure increases along the predicted wheel pressure transition (for example, according to the predicted wheel pressure transition). Further, even when the wheel pressure is insufficient, as long as boosting performance of the servo pressure generating device 4 is properly maintained, the wheel pressure remains equal to or above the allowable lower limit value.

According to this configuration, appropriate responsiveness can be more reliably ensured by executing the auxiliary increase control according to the situation such as when an unexpected situation occurs. In FIG. 3, a chain double-dashed line indicates the allowable lower limit value, and a broken line indicates an example in which the wheel pressure is not sufficiently boosted and the wheel pressure is less than the allowable lower limit value. Further, a stop of the auxiliary reduction control and a start of the auxiliary increase control may be executed when the actual braking force (wheel pressure) is less than the target braking force (target wheel pressure) and an increase gradient of the actual braking force (wheel pressure) is less than a predetermined gradient.

Further, when the auxiliary increase control is executed, the control unit 63 continues the auxiliary increase control until the actual braking force reaches the target braking force, that is, the wheel pressure reaches the target wheel pressure. As a result, frequency of switching on/off (or strength) of the actuator 5 is reduced, and occurrence of hunting of an upstream pressure and a downstream pressure is also prevented.

When emergency braking is detected during the auxiliary reduction control, the control unit 63 stops the auxiliary reduction control to increase the auxiliary braking force. The control unit 63 determines that the emergency braking is performed when an increase gradient of a stroke becomes larger than the predetermined gradient, or when an increase gradient of the reaction force hydraulic pressure becomes larger than the predetermined gradient. In this way, the control unit 63 detects the emergency braking based on the increase gradient of the stroke or the increase gradient of the reaction force hydraulic pressure. As a result, even during the auxiliary reduction control, when an emergency braking state is reached due to stepping on or the like, the appropriate responsiveness is exhibited.

Figure 4:
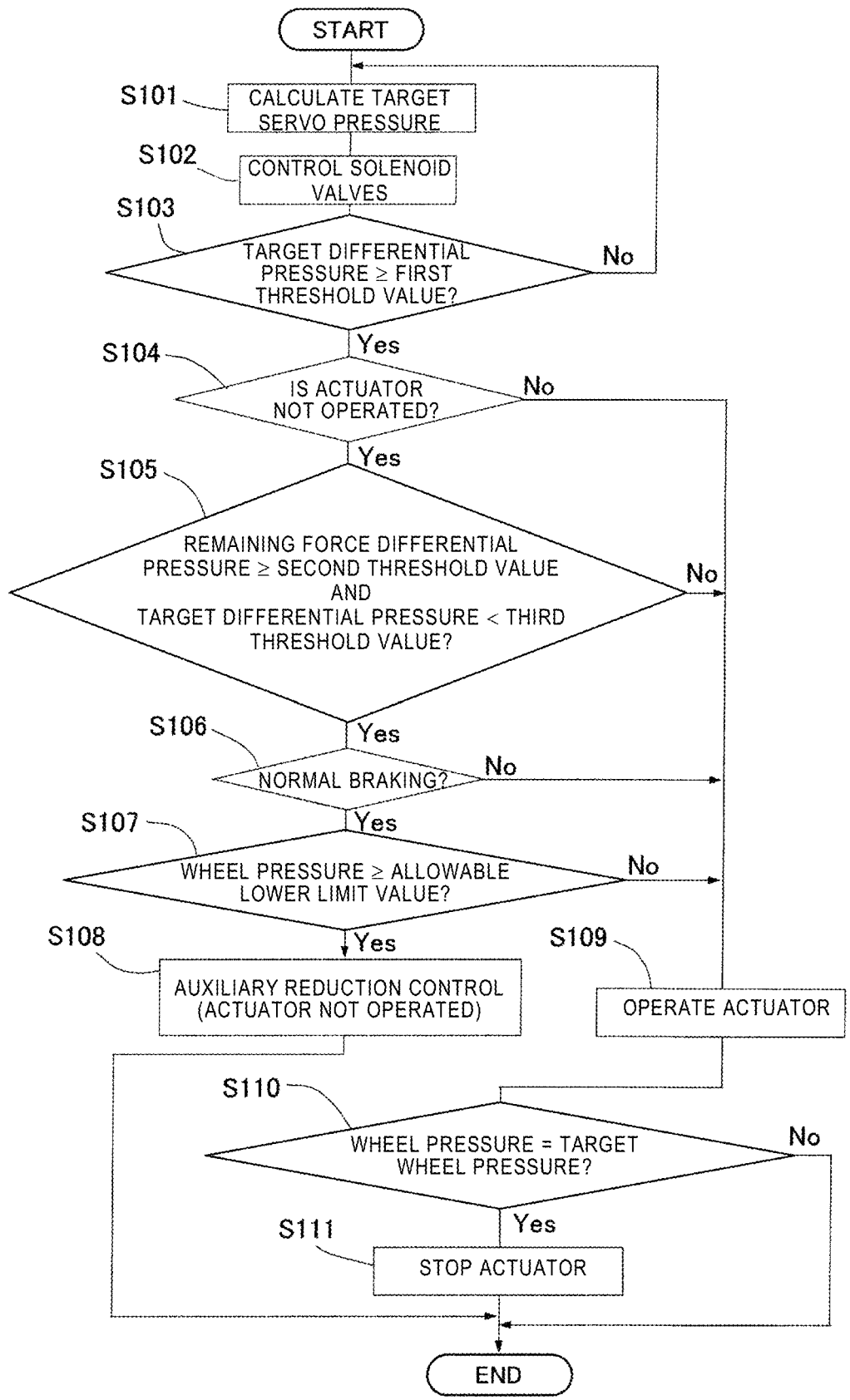
FIG. 4 is a flowchart for illustrating auxiliary reduction control according to the present embodiment.

A control flow of the present embodiment will be described with reference to FIG. 4. For example, when a driver requests braking, the brake ECU 6 calculates the target servo pressure based on the target braking force (S101). Then, the brake ECU 6 controls each solenoid valve of the servo pressure generating device 4 based on the target servo pressure (S102). Then, the first determination unit 61 determines whether or not there is a predetermined shortage of the braking force (S103). That is, the first determination unit 61 determines whether or not the target differential pressure is equal to or larger than the first threshold value.

When the target differential pressure is equal to or higher than the first threshold value (S103: Yes) and the actuator 5 is not operated (S104: Yes), the second determination unit 62 determines whether or not the delay correlation value is within the allowable range (S105). That is, the second determination unit 62 determines whether or not the remaining force differential pressure is equal to or larger than the second threshold value and the target differential pressure is less than the third threshold value.

When the remaining force differential pressure is equal to or larger than the second threshold value and the target differential pressure is less than the third threshold value (S105: Yes), and when normal braking (that is, non-emergency braking) is performed (S106: Yes) and the wheel pressure is equal to or larger than the allowable lower limit value (S107: Yes), the auxiliary reduction control is executed (S108). That is, in the present embodiment, the auxiliary braking force is set to 0 and the actuator 5 is maintained to be not operated by the auxiliary reduction control.

On the other hand, when the actuator 5 is already operated (S104: No), or the delay correlation value is out of the allowable range (S105: No), or the emergency braking is performed (S106: No), or the wheel pressure is less than the allowable lower limit value (S107: No), the brake ECU6 causes the actuator 5 to operate (S109). Then, when the wheel pressure reaches the target wheel pressure (S110: Yes), the brake ECU 6 stops the actuator 5 (S111). When the actuator 5 is operated during the auxiliary reduction control, the control unit 63 makes the auxiliary braking force generated by the actuator 5 smaller than the normal value (for example, a value set according to the situation in which insufficient determination occurs).

Performance (e.g., responsiveness) of the servo pressure generating device 4 for increasing the braking force may be decreased, for example, due to a change in component sliding resistance or hysteresis amount caused by aged deterioration, or a change in temperature environment. In a configuration of related art, the actuator is conventionally operated even when the decrease in the performance is within the allowable range. That is, when the target braking force can be generated within an allowable time.

However, according to the present embodiment, even at a timing of generating the auxiliary braking force, as long as the delay correlation value is within the allowable range, the auxiliary braking force can be reduced (in the present embodiment, the auxiliary braking force is zero), and operating noise of the actuator 5 can be reduced. According to the auxiliary reduction control, by waiting for a while, a case where the target wheel pressure is achieved only by the servo pressure generating device 4 and the master cylinder portion 1 can be expected in a state where the operating noise is reduced. Since the auxiliary reduction control is executed only when the delay correlation value is within the allowable range, the appropriate responsiveness can be ensured.

Further, in the device that generates the hydraulic braking force in the upstream and downstream as in the present embodiment, an upstream and downstream pressurizing mechanism, that is, the master cylinder portion 1 and the actuator 5 are communicated with each other. Therefore, when operating frequency of the actuator 5 is increased to generate the auxiliary braking force, a possibility that the upstream pressure is hunted also increases. The hunting affects brake feel and durability of components. However, according to the present embodiment, the operating frequency of the actuator 5 can be reduced, a possibility of the hunting can be reduced, and the brake feel and the durability can be improved.

Other Embodiments

The disclosure is not limited to the above-described embodiment. For example, the braking control device BF may be configured to include an electric braking device as a braking unit. For example, the electric braking device presses the brake pad Z1 against the brake rotor Z2 in an electric direct acting manner instead of a hydraulic manner to generate a braking force. In addition to the above, the delay correlation value can be set to a value related to generation delay of the braking force (decrease in performance of the first braking unit) such as a total usage time of the motor and duration of a low temperature state. Further, threshold values used for various determinations such as the first to third threshold values may be set so as to change depending on, for example, the increase gradient of the target wheel pressure or a hydraulic pressure level of the wheel pressure. Further, the disclosure can be applied to techniques of automatic driving and automatic braking. The actual braking force corresponds to an actual value of the braking force, and the target braking force corresponds to a target value of the braking force.

The invention claimed is:

1. A brake control device comprising:
  a first braking unit configured to generate actual braking force applied to a wheel of a vehicle;
  a second braking unit configured to generate auxiliary braking force applied to the wheel when the actual braking force is short by a predetermined amount;
  a determination unit configured to determine whether a delay correlation value correlated with response delay of the actual braking force is within an allowable range when the auxiliary braking force is generated; and
  a control unit configured to execute auxiliary reduction control for reducing the auxiliary braking force when the determination unit determines that the delay correlation value is within the allowable range.

2. The brake control device of claim 1, wherein
  the control unit is configured to stop the auxiliary reduction control, and execute auxiliary increase control for increasing the auxiliary braking force, when the actual braking force is less than a target braking force and the actual braking force is less than an allowable lower limit value or an increase gradient of the actual braking force is less than a predetermined gradient.

3. The brake control device of claim 2, wherein
  the control unit is configured to continue executing the auxiliary increase control until the actual braking force reaches the target braking force.

4. The brake control device of claim 3, wherein
  the control unit is configured to stop the auxiliary reduction control and then increase the auxiliary braking force when emergency braking is detected during the auxiliary reduction control.

5. The brake control device of claim 2, wherein
  the control unit is configured to stop the auxiliary reduction control and then increase the auxiliary braking force when emergency braking is detected during the auxiliary reduction control.

6. The brake control device of claim 2, wherein
  the control unit is configured to not operate the second braking unit when the determination unit determines that the delay correlation value is within the allowable range.

7. The brake control device of claim 3, wherein
  the control unit is configured to not operate the second braking unit when the determination unit determines that the delay correlation value is within the allowable range.

8. The brake control device of claim 1, wherein
  the control unit is configured to stop the auxiliary reduction control and then increase the auxiliary braking force when emergency braking is detected during the auxiliary reduction control.

9. The brake control device of claim 8, wherein
  the control unit is configured to not operate the second braking unit when the determination unit determines that the delay correlation value is within the allowable range.

10. The brake control device of claim 1, wherein
  the control unit is configured to not operate the second braking unit when the determination unit determines that the delay correlation value is within the allowable range.

* * * * *